United States Patent [19]

Faroudja

[11] Patent Number: 5,754,248
[45] Date of Patent: May 19, 1998

[54] UNIVERSAL VIDEO DISC RECORD AND PLAYBACK EMPLOYING MOTION SIGNALS FOR HIGH QUALITY PLAYBACK OF NON-FILM SOURCES

[76] Inventor: Yves C. Faroudja, 26595 Anacapa Dr., Los Altos Hills, Calif. 94022

[21] Appl. No.: 632,027

[22] Filed: Apr. 15, 1996

[51] Int. Cl.[6] .................................................. H04N 7/01
[52] U.S. Cl. ........................... 348/474; 348/441; 348/452; 348/459; 348/429; 386/123
[58] Field of Search ........................ 348/448, 429, 348/474, 469, 441, 446, 556, 459, 458, 911; 386/123

[56] References Cited

U.S. PATENT DOCUMENTS

| | | |
|---|---|---|
| 4,876,976 | 10/1989 | Brower et al. . |
| 5,191,416 | 3/1993 | Dickson et al. ............... 348/441 |
| 5,200,821 | 4/1993 | Haghiri et al. . |
| 5,291,280 | 3/1994 | Faroudja et al. . |
| 5,329,309 | 7/1994 | Dorricott et al. ............ 348/446 |
| 5,337,154 | 8/1994 | Dorricott et al. . |
| 5,353,119 | 10/1994 | Dorricott et al. . |
| 5,400,077 | 3/1995 | Cookson et al. ............ 348/556 |
| 5,430,489 | 7/1995 | Richards et al. . |
| 5,430,490 | 7/1995 | Chai . |
| 5,457,499 | 10/1995 | Lim ........................... 348/474 |
| 5,488,422 | 1/1996 | Faroudja et al. ............ 348/448 |
| 5,508,746 | 4/1996 | Lim ........................... 348/429 |
| 5,627,592 | 5/1997 | Tichelaar et al. ........... 348/429 |
| 5,633,687 | 5/1997 | Bhayani et al. ............. 348/441 |

FOREIGN PATENT DOCUMENTS

| | | |
|---|---|---|
| 0650297 | 4/1989 | European Pat. Off. . |
| 2277006 | 10/1994 | United Kingdom . |
| 9302526 | 2/1993 | WIPO . |
| 9430006 | 12/1994 | WIPO . |
| 9512275 | 5/1995 | WIPO . |
| 9512283 | 5/1995 | WIPO . |
| 9627981 | 9/1996 | WIPO . |

OTHER PUBLICATIONS

"Motion Detection of an Interlaced Video Signal" by Tero Koivunen, IEEE Transactions on Consumer Electronics, Vo.40 No. 3, Aug. 1994.

A Codec for HDTV, by A Netravali, et al., IEEE Trans. Consumer Electronics, vol. 38 No. 3 pp. 325–340 Aug. 1992.

"Advances in Picture Coding" by Musmann et al., Proc. IEEE, vol. 73 No. 4 pp. 523–548, Apr. 1985.

*Primary Examiner*—Victor R. Kostak
*Attorney, Agent, or Firm*—Thomas A. Gallagher

[57] ABSTRACT

A "universal" system records or transmits both 24 fps (or 25 fps) motion picture film sources and non-film interlaced or progressively-scanned video sources, employing any one of several international television standards (e.g., NTSC, PAL, HDTV/ATV, etc.) as progressively-scanned video at a nominal frame rate of 24 or 25 frames per second (i.e., 24 Hz or 25 Hz). When the source is interlaced video, a real-time motion signal, independent of motionless vertical transitions between the temporally displaced fields in the interlaced television signal, is recorded or transmitted along with the progressively-scanned video data. Use of a real-time motion signal in reproducing video derived from an interlaced television signal source results in a reproduced interlaced television signal (whether a conventional NTSC or PAL reproduction or an enhanced reproduction) substantially free of interlace errors, despite the conversion to and from progressive scanning, or, alternatively, a reproduced frame-multiplied progressively-scanned television signal substantially free of motion artifacts, despite the conversion to progressive scanning and the subsequent multiplication of frame rate.

3 Claims, 16 Drawing Sheets

| SOURCE | VIDEO RECORD FRAME RATE | RECORD DISC SPEED | NTSC PLAYBACK FRAME RATE | NTSC PLAYBACK DISC SPEED | PAL PLAYBACK FRAME RATE | PAL PLAYBACK DISC SPEED |
|---|---|---|---|---|---|---|
| 24 fps FILM | 24 Hz | 1x | 24 Hz | 1x | | |
| 25 fps FILM | 25 Hz | (25/24)x | | | 25 Hz | (25/24)x |
| 60 Hz VIDEO | 24 Hz | 1x | 24 Hz | 1x | 24 Hz 25 Hz | 1x (25/24)x |
| 50 Hz VIDEO | 25 Hz | (25/24)x | 24 Hz 25 Hz | 1x (25/24)x | 25 Hz | (25/24)x |

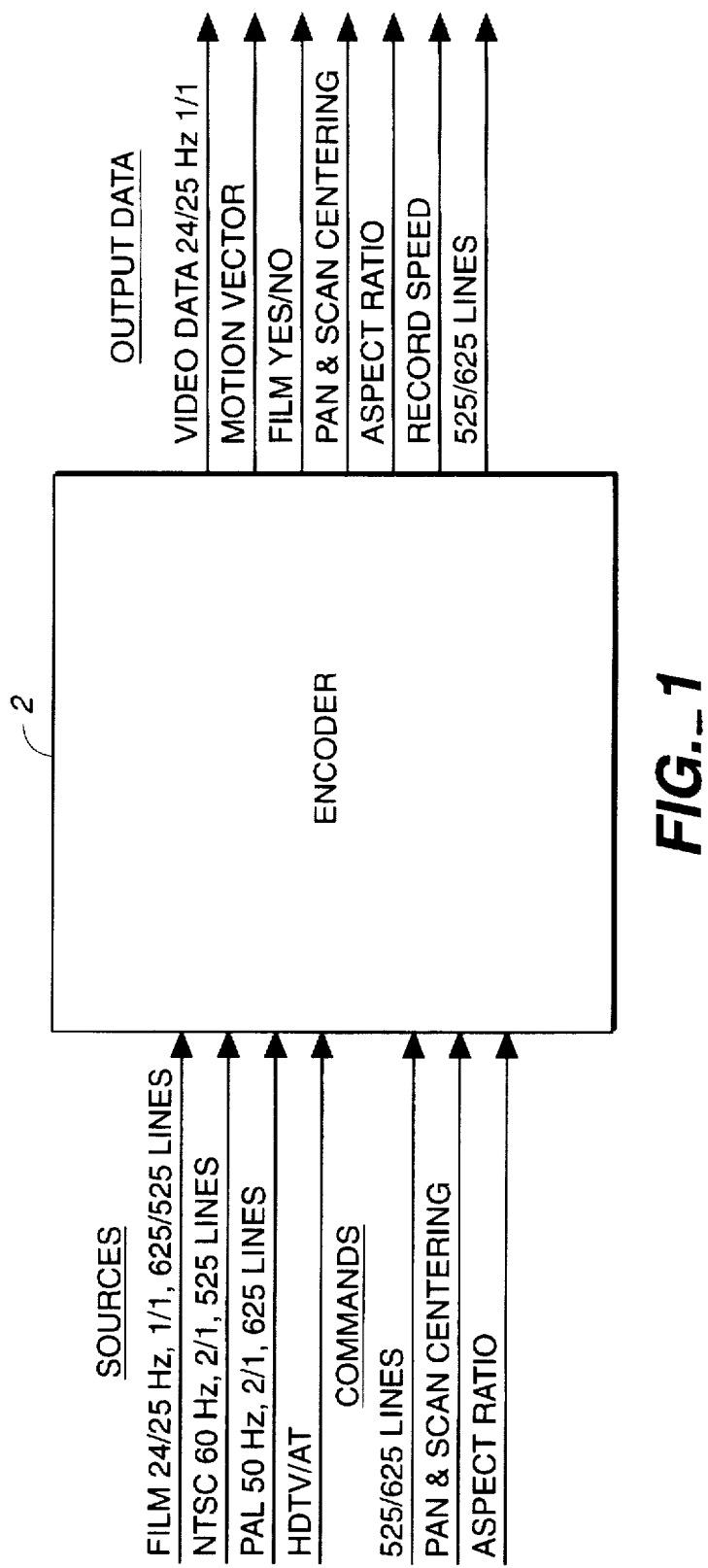
FIG._1

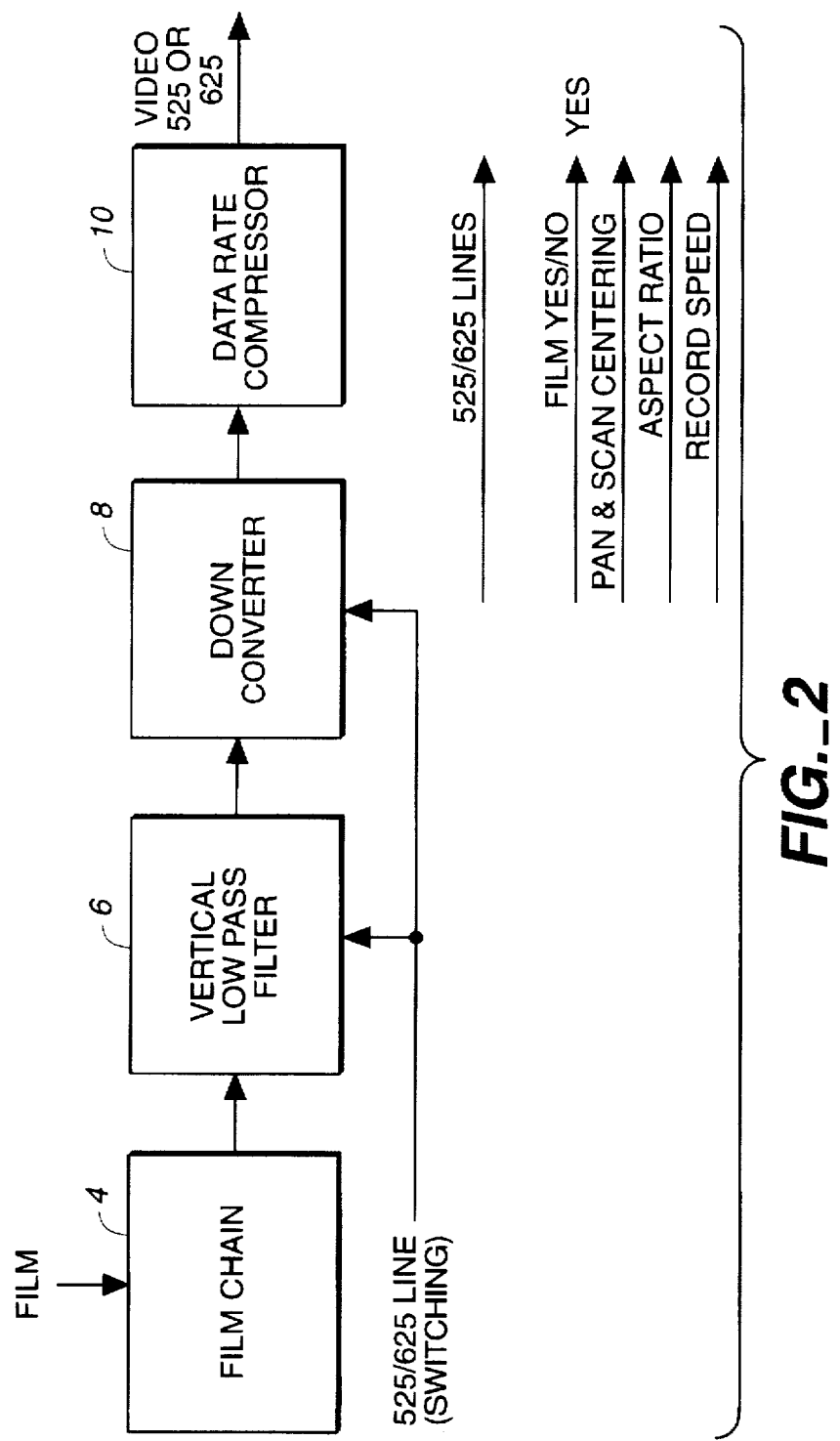
FIG._2

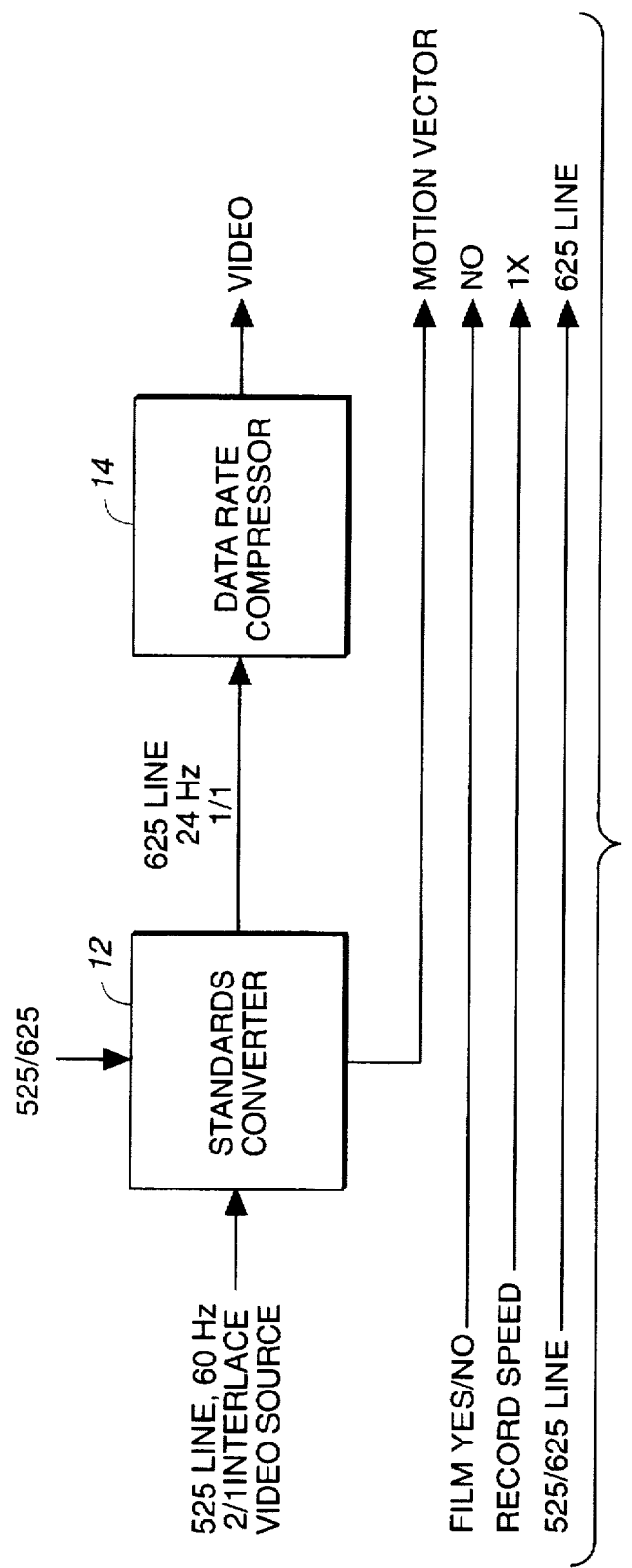
FIG._3

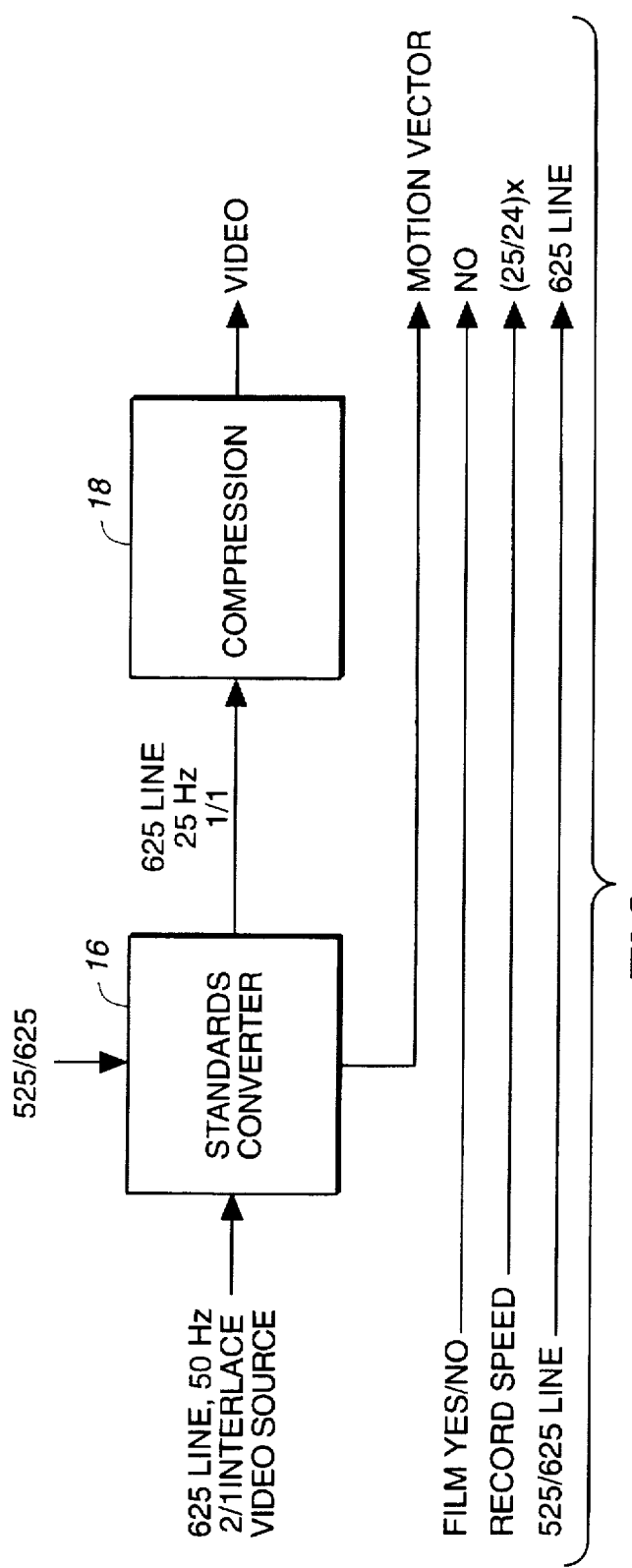
FIG._4

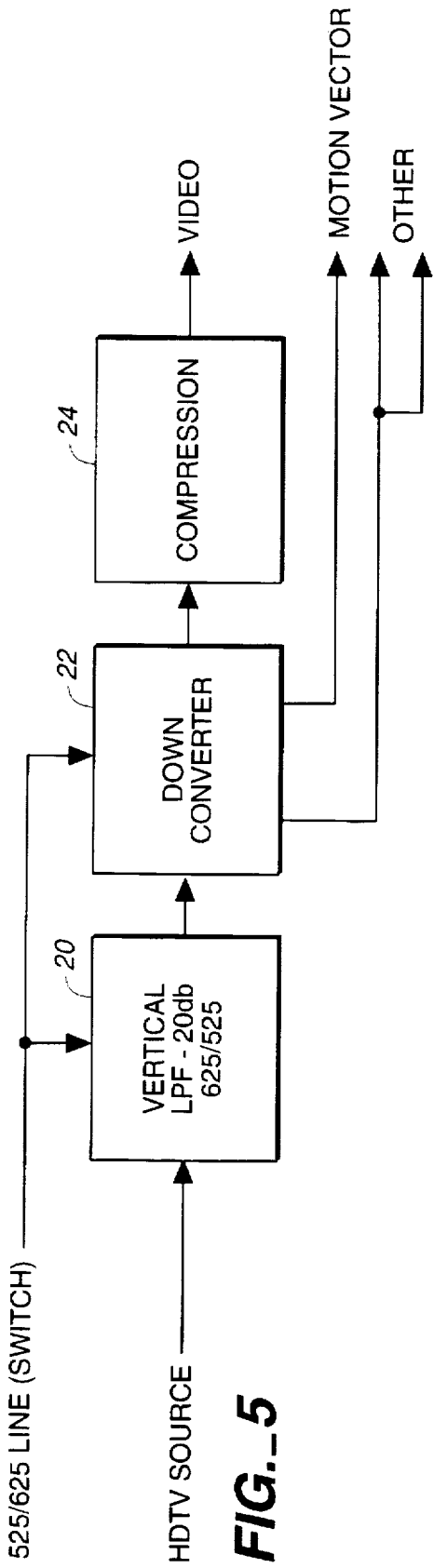

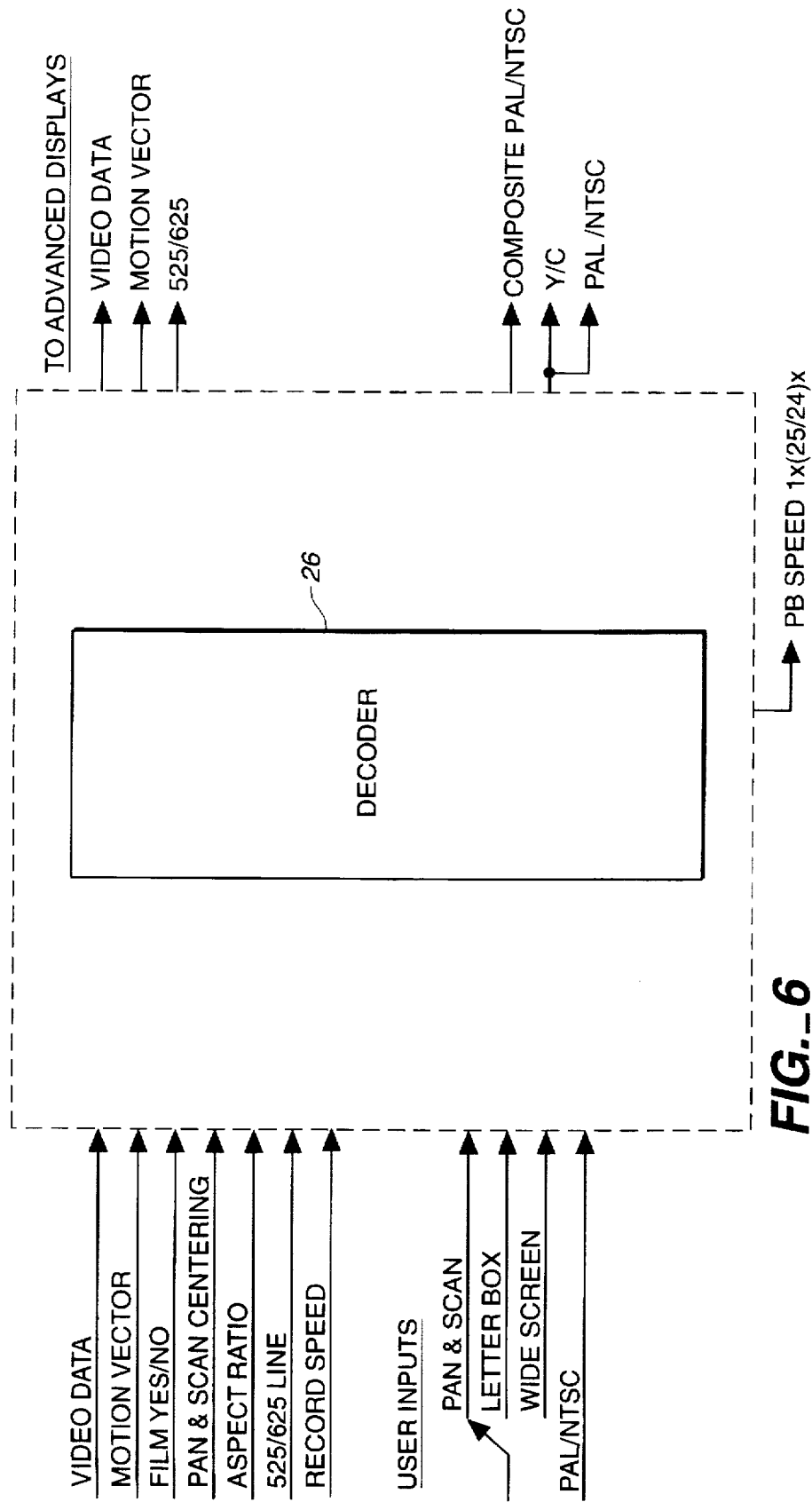
FIG._6

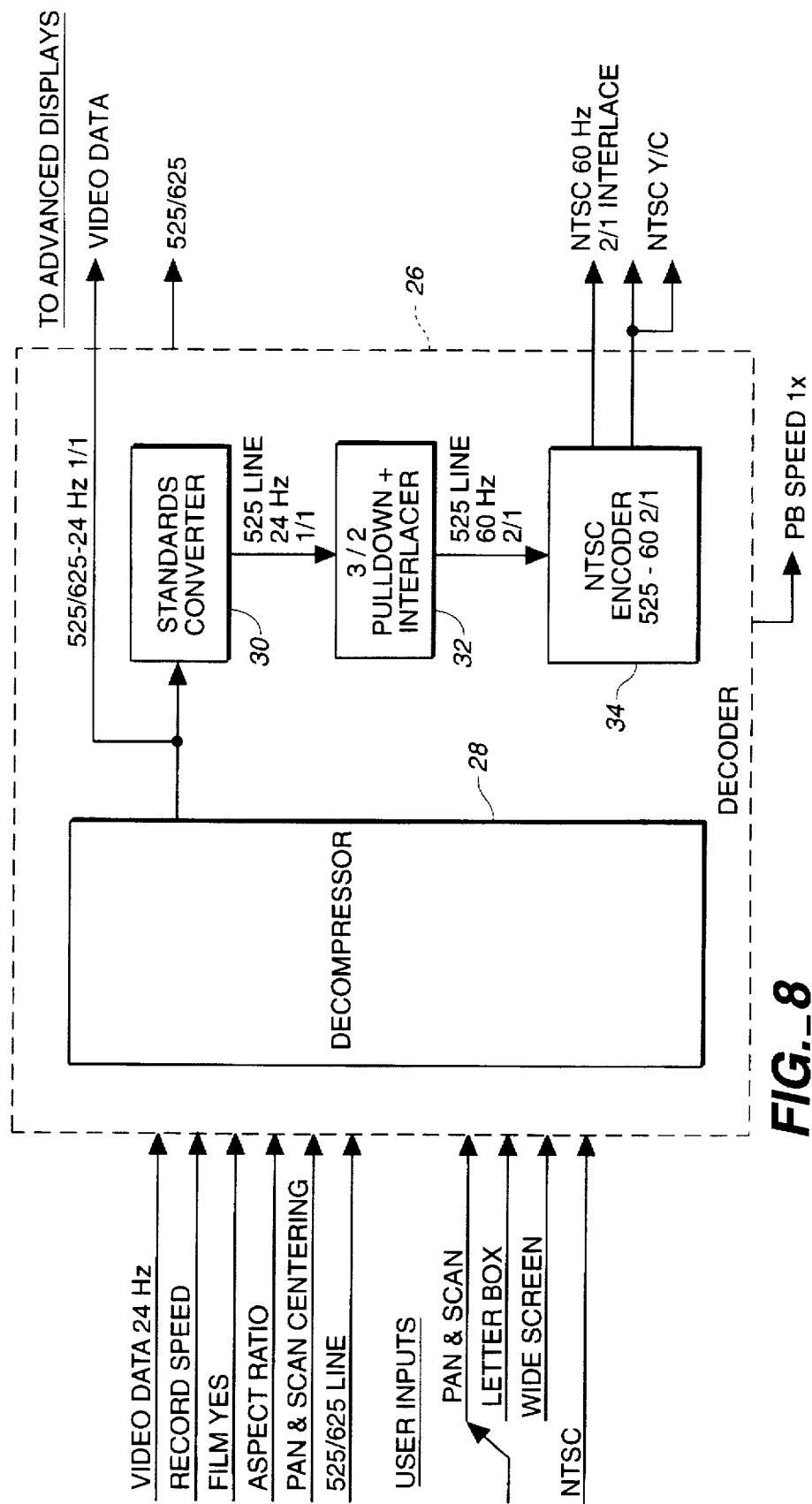
FIG._8

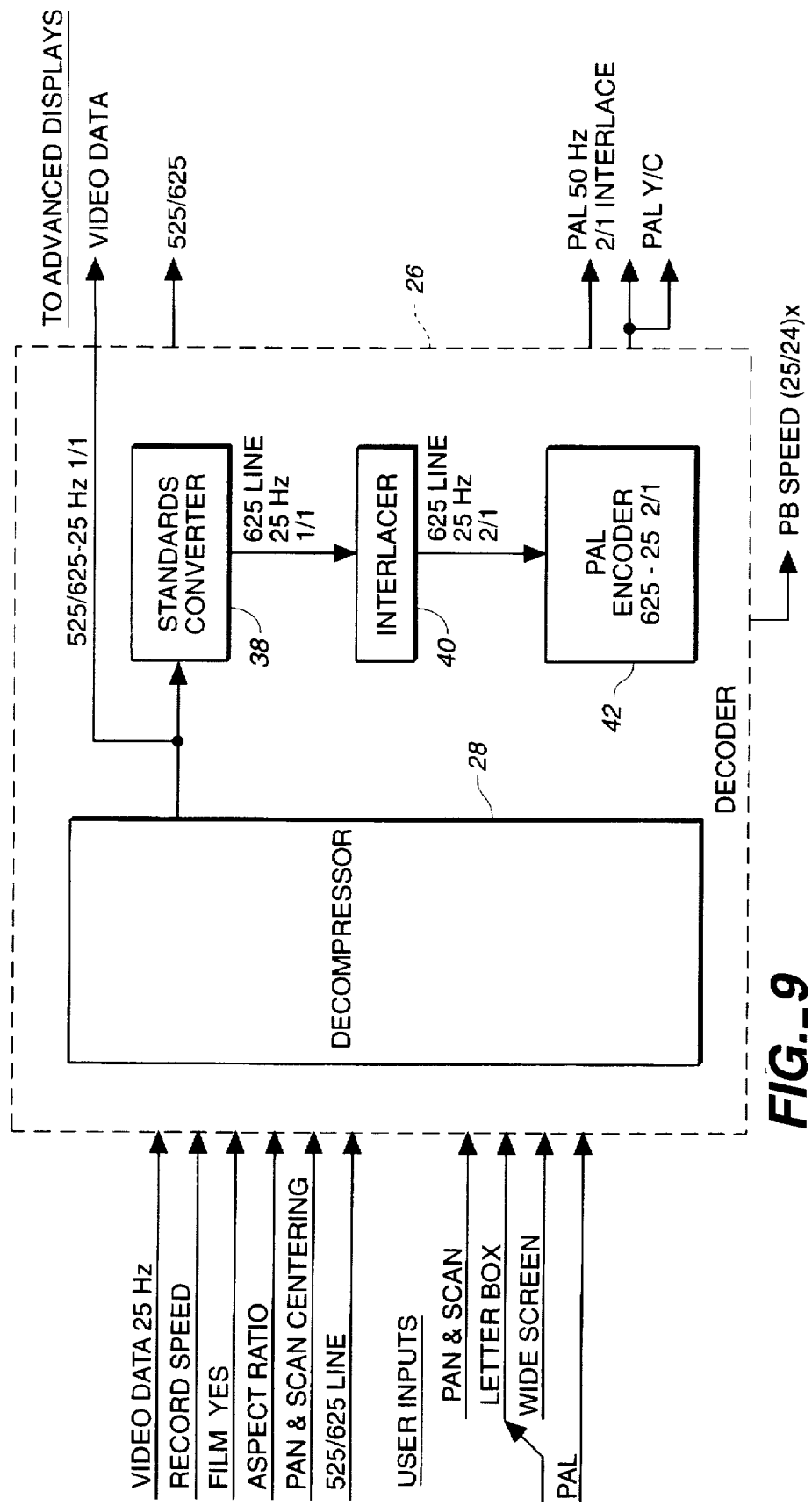
FIG._9

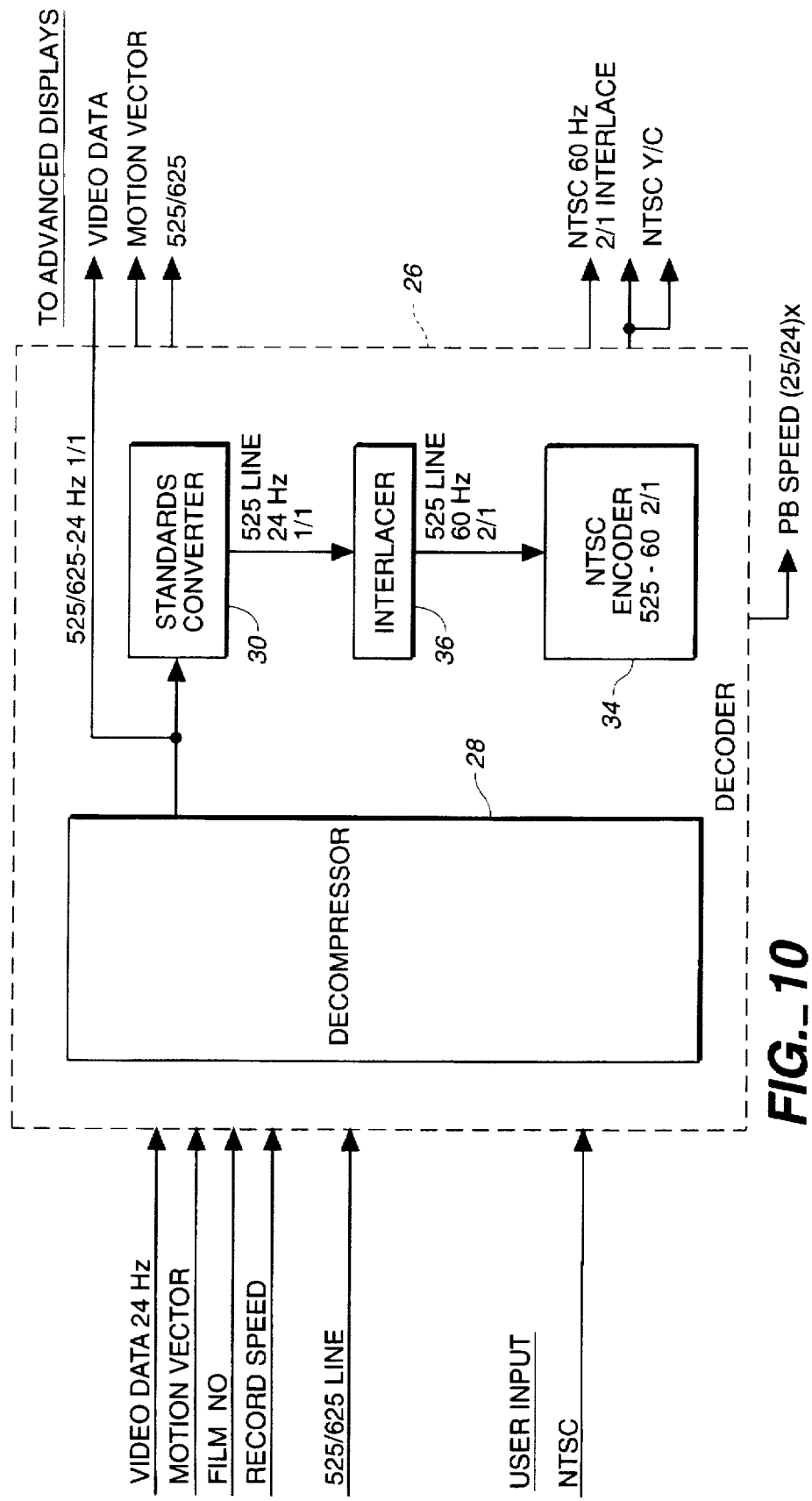
FIG._10

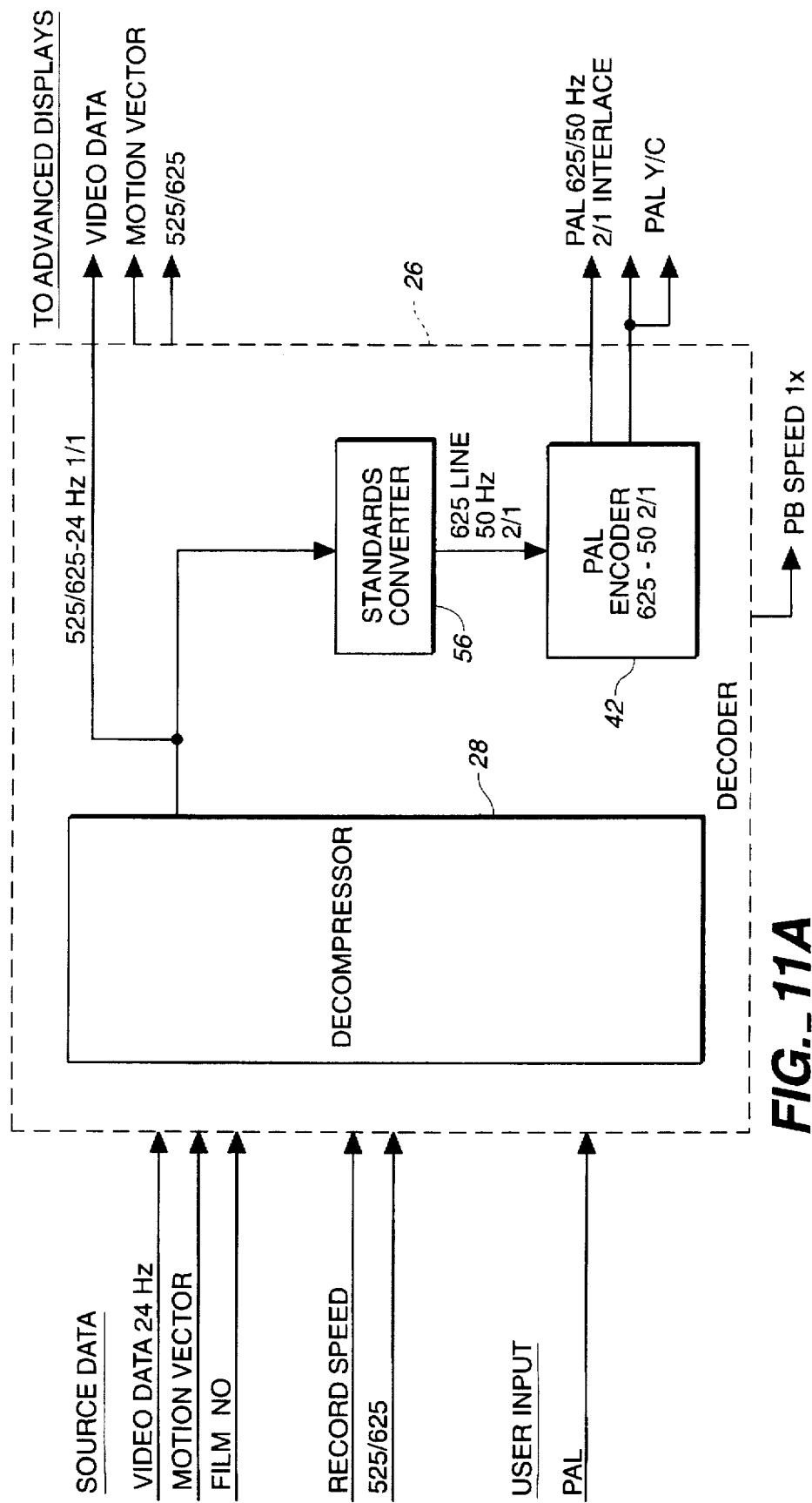
FIG._11A

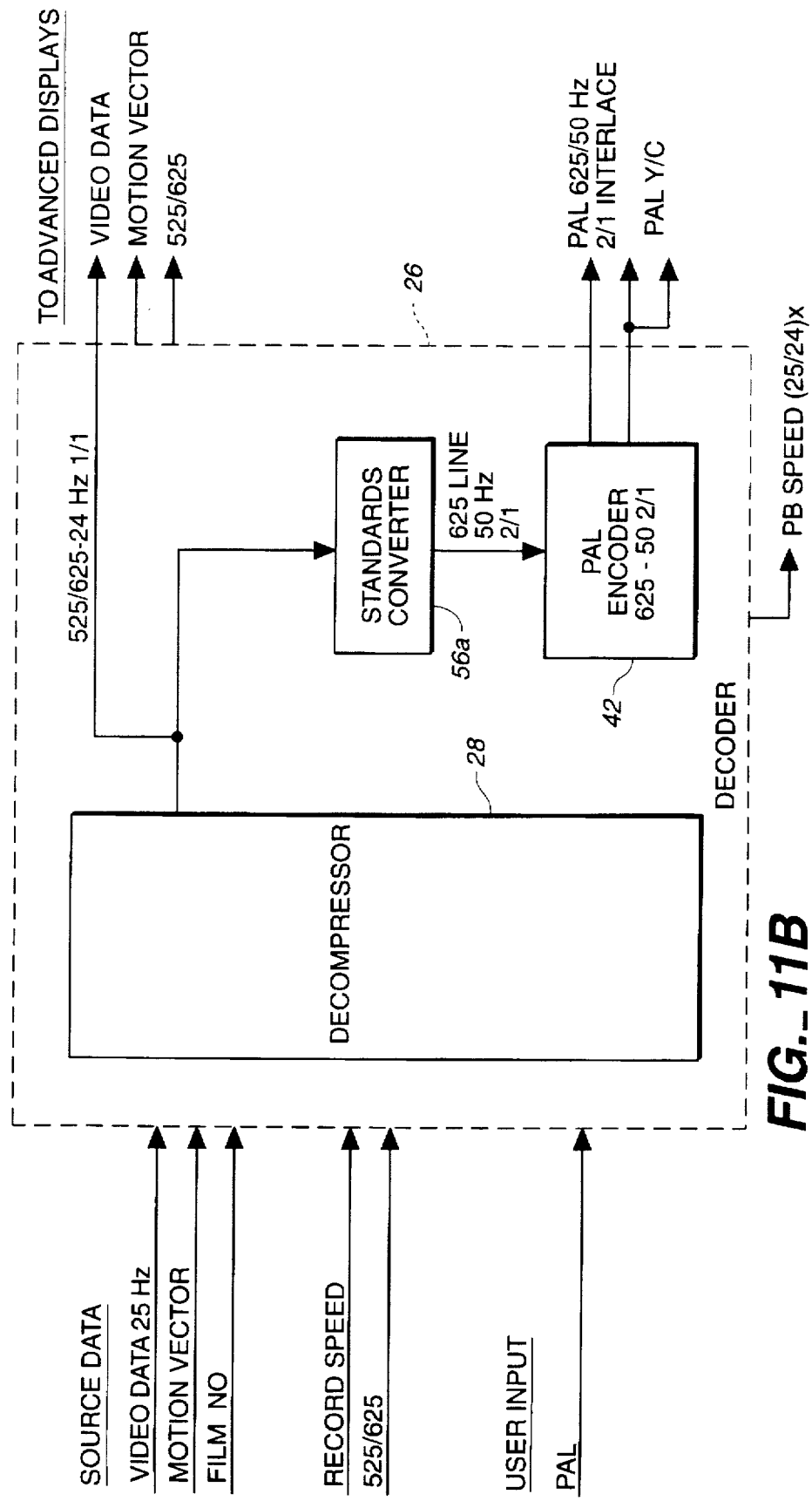
FIG._11B

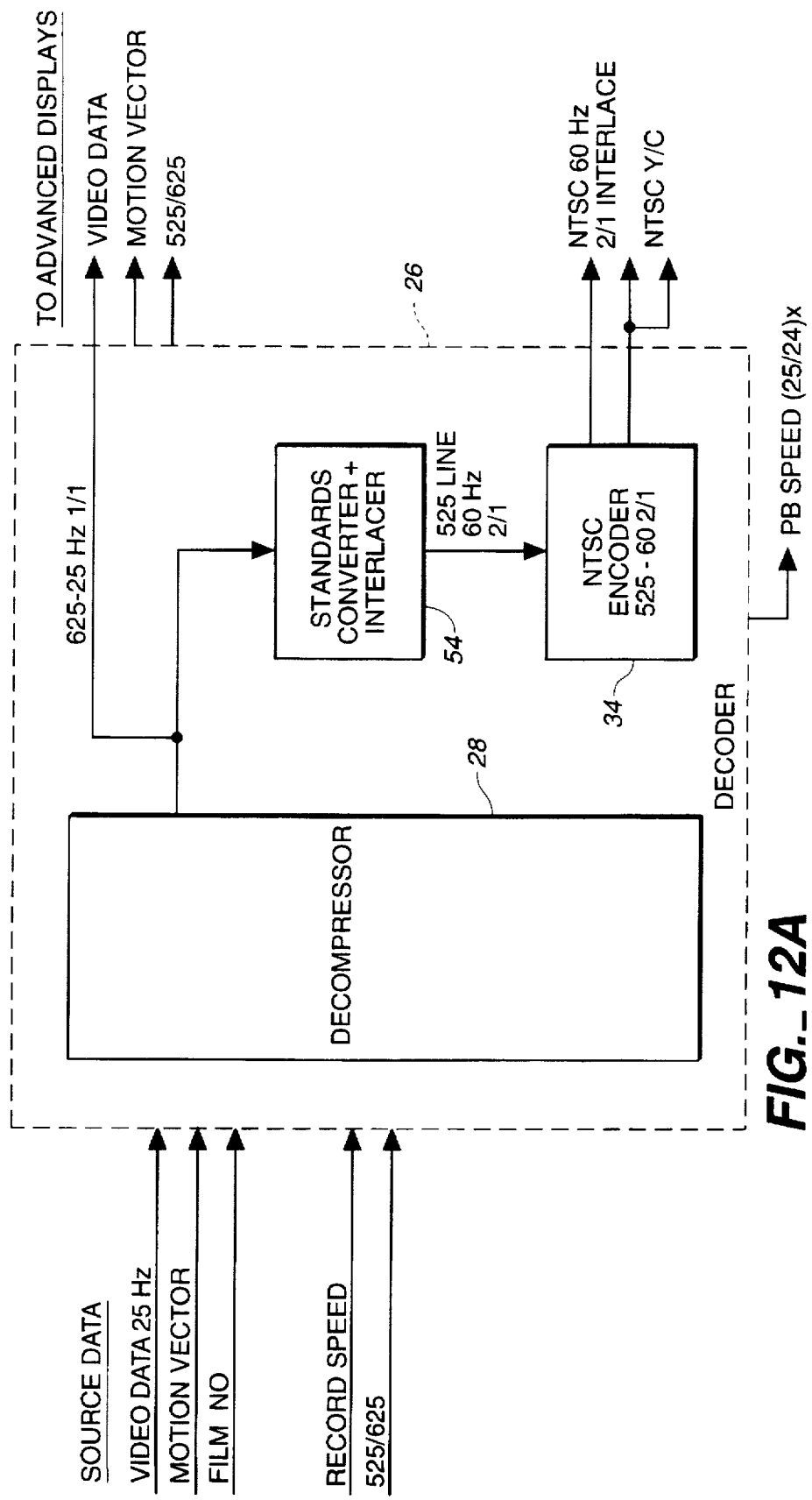
FIG._12A

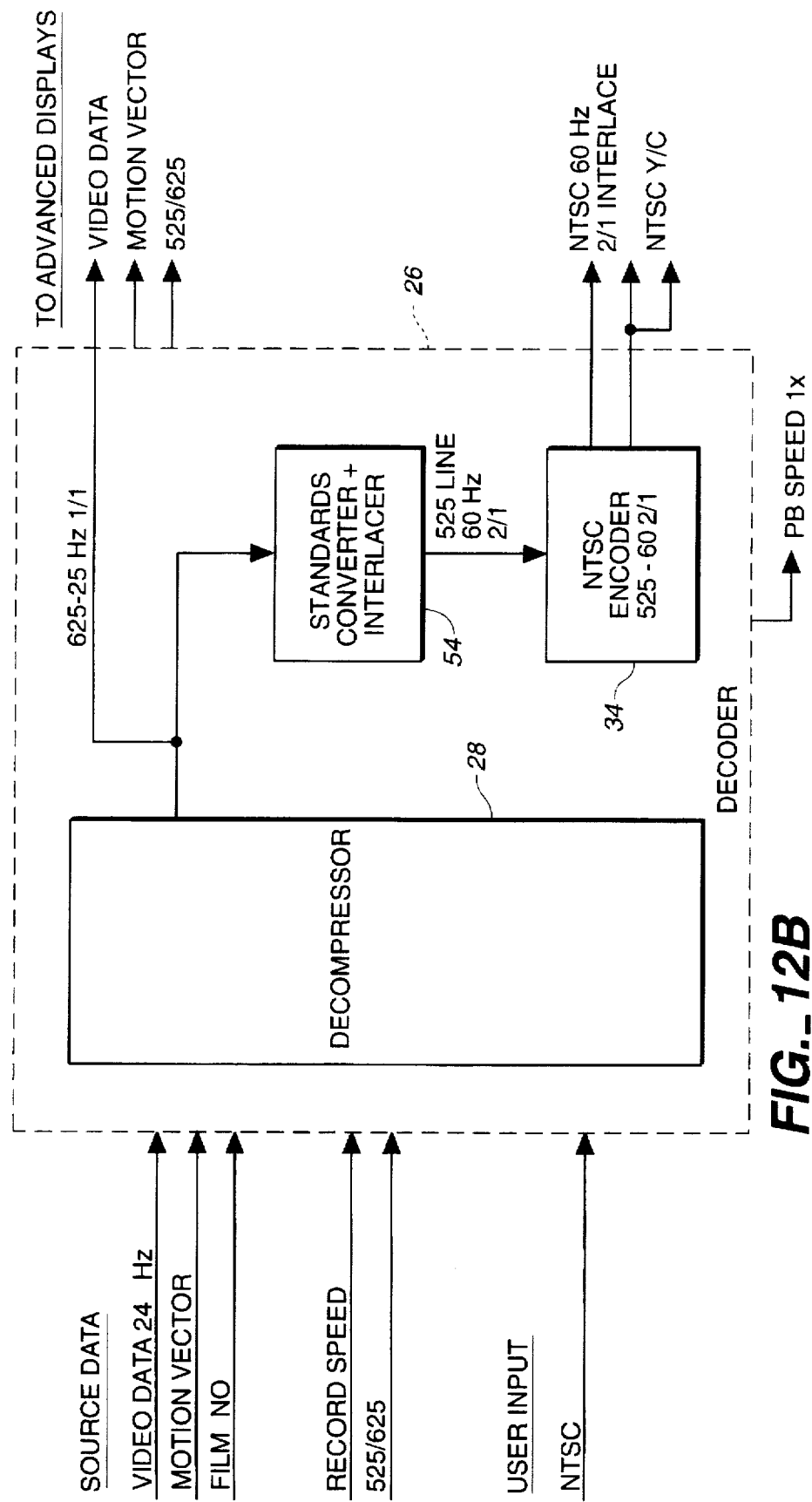
FIG._12B

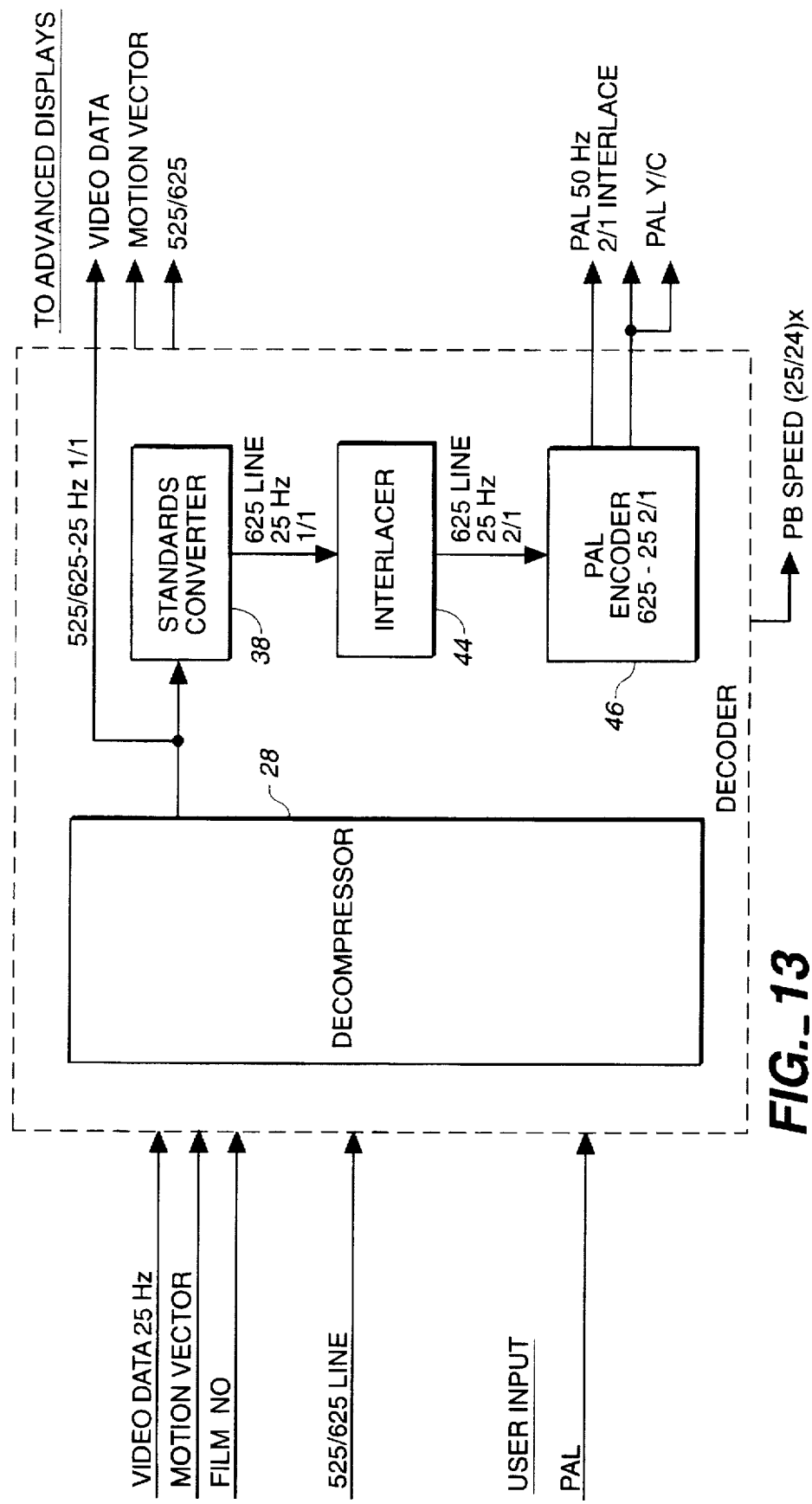
FIG._13

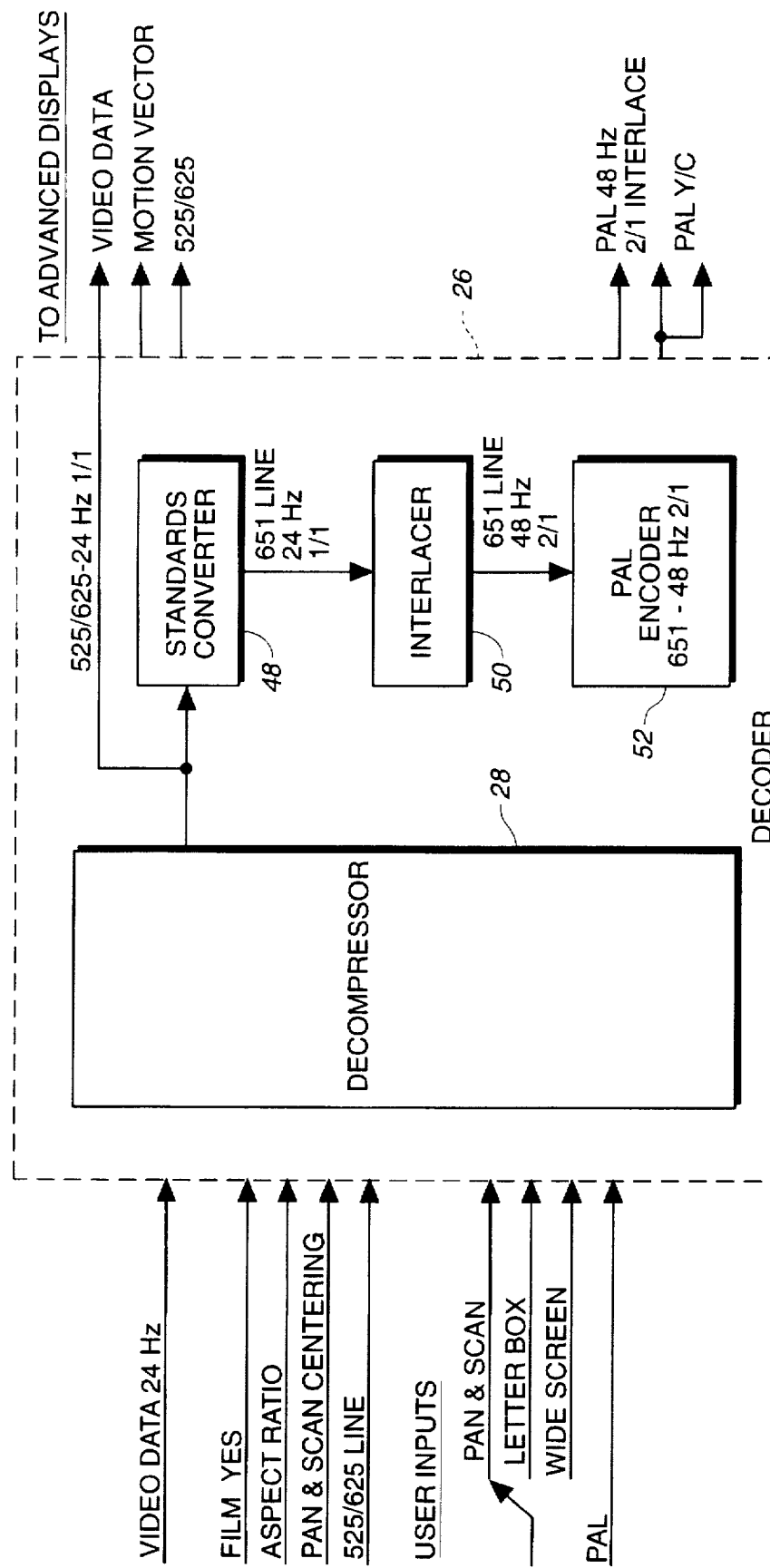
FIG._14

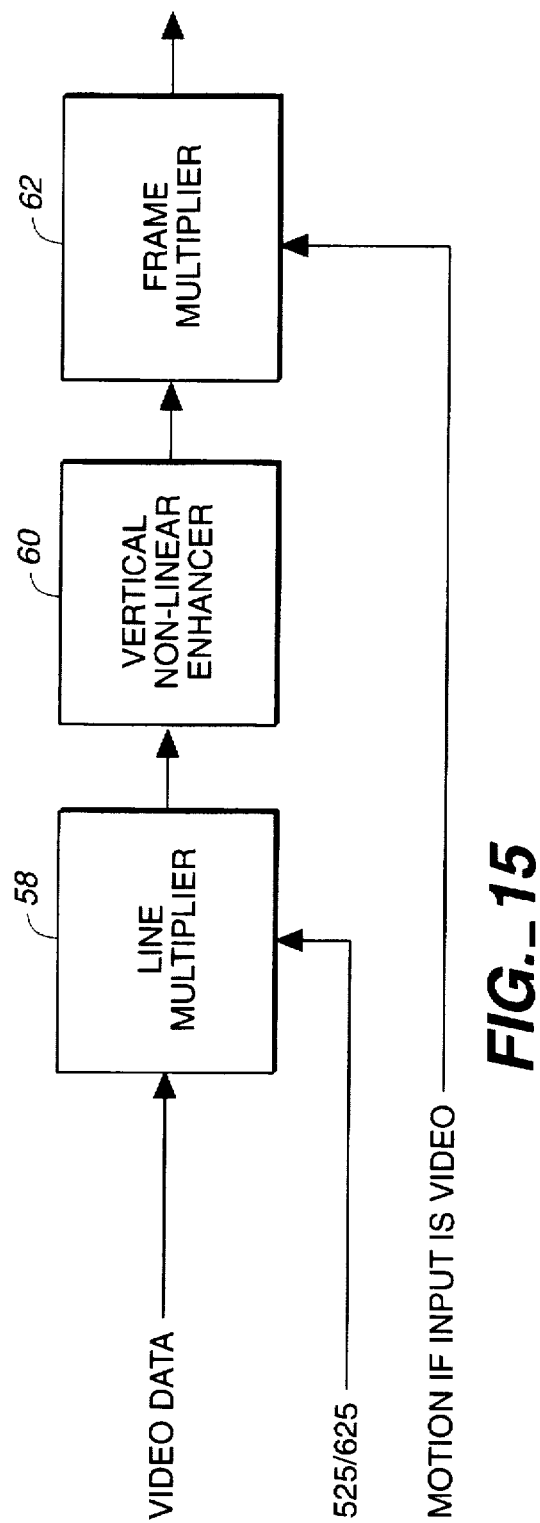
FIG._15

UNIVERSAL VIDEO DISC RECORD AND PLAYBACK EMPLOYING MOTION SIGNALS FOR HIGH QUALITY PLAYBACK OF NON-FILM SOURCES

FIELD OF THE INVENTION

The present invention relates to television signal processing. More particularly, the present invention relates to improved signal processing apparatus and methods for recording and transmitting motion picture film sources and non-film interlaced or progressively-scanned video sources, employing any one of several international television standards (e.g., NTSC, PAL, HDTV/ATV, etc.), all as progressively-scanned video at a nominal frame rate of 24 or 25 frames per second (i.e., 24 Hz or 25 Hz). The invention is particularly applicable to digital video disc recording and playback.

SUMMARY OF THE PRIOR ART

U.S. Pat. No. 5,400,077 and related published international patent applications WO 95/12275 and WO 95/12283 disclose aspects of a "universal" video disc system in which a 24 fps motion picture source is recorded as 24 frame per second (i.e., 24 Hz), progressively-scanned video data. However, the disclosed system does not contemplate non-film video sources such as, for example, an interlaced television signal source. The video disc is intended for playback, after suitable standards conversion, by either standard resolution or high resolution consumer television reproducers employing any one of several international television standards (PAL, NTSC, etc.).

A series of related patents, U.S. Pat. Nos. 5,329,309; 5,337,154; 5,353,119; and 5,430,489 disclose arrangements for recording or transmitting data representing both film and interlaced television sources using a single one of various video data formats. The arrangements contemplate reproduction by various progressively- and interlaced-scanned reproduction formats derived from each single video data recording/transmission format. For some system configurations, a motion control signal is developed in the encoder and independently synthesized in the decoding portion of the system for the purpose of motion compensated interpolation; however, no motion control signal is transmitted or recorded along with the video information.

It is known to derive a motion signal when converting an interlaced television signal to a progressively scanned television signal, as, for example, in "line doublers" of the type which convert the interlaced signal to progressive scan such that the progressive scan frame rate corresponds to the interlaced scan field rate and each progressively scanned frame has twice as many scan lines as in each interlaced field. See, for example, U.S. Pat. Nos. 5,430,490 and 5,291,280, U.K. Patent GB 2,277,006, published international patent application WO 94/30006, and "Motion Detection of an Interlaced Video Signal," by Tero Koivunen, *IEEE Transactions on Consumer Electronics*, Vol. 40, No. 3, August 1994. In such prior art, the motion signals are not transmitted or recorded along with the progressively scanned video signal information. U.S. Pat. No. 5,291,280 and published international application WO 94/30006 disclose techniques for detecting motion between successive fields of opposite polarity in a 2-1 interlaced television signal, particularly for the purpose of determining when the interlaced television signal source was a motion picture film.

The MPEG-2 video compression standard (i.e., ISO standard 13818 or ITU-T Recommendation H.262) supports both interlaced and noninterlaced pictures. Motion compensation is used for prediction of the current picture from a previous picture and for interpolative prediction from past and future pictures. In its dual-prime prediction mode for interlaced pictures, MPEG-2 derives motion vectors from opposite parity fields in non-current frames for the purpose of predicting current fields. The motion vectors are used for data compressing and decompressing an interlaced picture. MPEG-2 also employs motion vectors for the purpose of data compressing and decompressing progressively scanned pictures. MPEG-2 does not contemplate deriving a motion signal during the interlaced-to-progressive conversion of a television signal and the use of such a motion signal to re-convert the progressively-scanned television signal back to an interlaced format nor to multiply the frame rate of the progressively-scanned television signal.

SUMMARY OF THE INVENTION

In accordance with the teachings of the present invention, a "universal" recording and transmission system is provided in which both 24 fps (or 25 fps) motion picture film sources and non-film interlaced or progressively-scanned video sources, employing any one of several international television standards (e.g., NTSC, PAL, HDTV/ATV, etc.), are all recorded or transmitted as progressively-scanned video at a nominal frame rate of 24 or 25 frames per second (i.e., 24 Hz or 25 Hz). When the source is interlaced video, a real-time motion signal, independent of motionless vertical transitions between the temporally displaced fields in the interlaced television signal, is recorded or transmitted along with the progressively-scanned video data. In its simplest form, the motion signal may be a one-bit motion/no-motion word if the reduction in resolution when there is motion is acceptable. For better resolution, but at greater cost and complexity, the motion signal may be a multi-bit motion vector word.

Preferably, the recorded or transmitted video represents a 625-line picture in order to best match the horizontal resolution. Alternatively, the data may represent a 525-line picture. The source and the display may have other than 525 or 625 lines.

After suitable standards conversion, the progressively-scanned video data is reproduced in any of several ways: (1) as a conventional interlaced television signal (employing any one of several international television standards, such as PAL, NTSC, etc.) on a standard television set, or, (2) by applying additional processing (for example, one or more known techniques such as line multiplying, frame multiplying, and bandwidth-expansion type resolution enhancement): (a) as an enhanced resolution interlaced television signal, or, preferably, (b) as an enhanced resolution progressively-scanned television signal.

Use of a real-time motion signal in reproducing video derived from an interlaced television signal source results in a reproduced interlaced television signal (whether a conventional NTSC or PAL reproduction or an enhanced reproduction) substantially free of interlace errors, despite the conversion to and from progressive scanning, or, alternatively, a reproduced frame-multiplied progressively-scanned television signal substantially free of motion artifacts, despite the conversion to progressive scanning and the subsequent multiplication of frame rate. Although the frame rate of a progressively-scanned video signal derived from a film source may be passively frame multiplied (i.e., without the use of motion information for generating interpolated frames), the frame rate of a progressively-scanned video signal derived from a video source usually cannot be passively frame multiplied because of the greater motion content in video sources as a result of, for example, faster camera panning techniques.

Although the present invention may be employed with virtually any transmission or recording medium having sufficient bandwidth, the invention is particularly suitable for recording and reproducing coded bit streams on and from, respectively, a digital video disc (hereinafter "DVD"). For convenience in presentation, the invention is described in the environment of a DVD system. Thus, throughout this document, unless otherwise noted, references to "disc," "video disc," and "DVD" are intended to include any transmission or recording medium having such sufficient bandwidth. The details of the transmission or storage medium and the means for applying coded bit streams to and recovering coded bit streams from such transmission or storage media are well known and are not the subject of the present invention.

In accordance with the teachings of the present invention, a universal DVD is provided, in which all moving picture sources, including motion picture film sources, interlaced television sources, and progressively-scanned television sources, are recorded as one or more coded bit streams representing progressively-scanned video having a nominal frame rate of 24 Hz to match substantially the world-wide standard motion picture film frame rate (24 fps). A video frame rate corresponding to the motion picture film rate is preferred to optimize the recording and reproduction of motion picture sources, which make up about 80% of all television sources. Nevertheless, interlaced television signal sources and progressively-scanned video sources having frame rates higher than 24 Hz may also be recorded or transmitted as 24 Hz progressively-scanned video and reproduced with substantially no degradation, including high-resolution reproduction thereof despite the optimization of the record or transmission medium's format for motion picture film sources. This is accomplished by generating a motion signal when the source is converted to 24 Hz progressive and carrying the motion signal along with the coded bit streams representing the 24 Hz frame rate progressively-scanned television signal.

When the source is a 60 Hz field rate interlaced NTSC television signal, a 24 fps motion picture film, or an HDTV/ATV television signal (interlaced or progressively scanned) having a frame rate of 24 or 30 Hz or a multiple thereof (e.g., 60 Hz), the one or more coded bit streams recorded or transmitted represent progressively-scanned video having a nominal 24 Hz. To simplify the encoding process, when the source is a 50 Hz field rate interlaced PAL television signal, a 25 fps motion picture film, or an HDTV/ATV television signal (interlaced or progressively scanned) having a frame rate of 25 Hz or a multiple thereof (e.g., 50 Hz, 100 Hz), the one or more coded bit streams recorded or transmitted represent progressively-scanned video having a nominal 25 Hz frame rate rather than a nominal 24 Hz frame rate.

When the medium carrying the coded bit streams representing a progressively-scanned television signal is a record medium rather than a transmitting medium, such that the record and/or playback speed of the medium can be changed, 24 Hz record frame rate signals are recorded at a speed of "1×" and 25 Hz record frame rate signals are recorded at a speed of "(25/24)×," where "×" may be the standard record and play speed of the medium. Alternatively, "(25/24)×" may be the standard record and play speed of the medium.

Thus, when the medium or disc is played back at a speed of "1×," the bit stream coming off the disc represents progressively-scanned video having a 24 Hz frame rate and when a disc is played back at a speed of "(25/24)×," the bit stream coming off the disc represents progressively-scanned video having a 25 Hz frame rate. In order to facilitate playback at 25 Hz rather than 24 Hz in some cases, as is explained below, a record speed data indicator (one bit) is recorded along with the coded video bit streams. Some combinations of record and playback will result in slight motion and audio speed up or slow down. Changes in sound pitch may be easily compensated by various known techniques such as pitch shifting. Slight increases in picture motion are commonly tolerated by television viewers in Europe (24 fps motion picture films are played back at 25 fps in order to facilitate film to 50 Hz PAL video conversion, i.e., telecine).

In its preferred embodiment, the invention applies any of various known video bit-rate compression and decompression techniques to the bit stream representing the progressively-scanned television signal which is applied to and recovered from the DVD. For example, such compression and decompression may be implemented under the MPEG-2 standards, in which case the motion information present when the source is an interlaced television signal may be carried as auxiliary information in the MPEG-2 data stream or as an independent data stream.

In the preferred DVD embodiment, in addition to the video data and real-time motion information, other information about the source may be recorded, including a film YES/NO signal, an aspect ratio signal, a pan and scan centering signal, and a scanning line (525 or 625) signal. Such other information may also be carried, to the extent possible, as auxiliary information in the MPEG-2 data stream or in one or more independent data streams. The film YES/NO signal simplifies the decoding and standards conversion on playback (see, for example, U.S. Pat. Nos. 4,876,976, 4,982,280 and 5,291,280, each of which is incorporated herein by reference, in its entirety and International Publication WO 94/30006). Aspect ratio information allows inverse anamorphic processing during reproduction. A motion picture film source may be converted to progressively-scanned video in its native, directly off film, anamorphic condition. When the source is a wide screen format motion picture film, for example, the user may choose to display from the single video data stream: (1) a letterbox display format, (2) a smaller aspect ratio display by using pan and scan information for viewing on a conventional 4:3 aspect ratio reproducer, or (3) a widescreen display for viewing on an advanced 16:9 aspect ratio reproducer. It is not necessary to record separate data streams for the various display choices.

BRIEF DESCRIPTION OF THE DRAWINGS

FIG. 1 is a block diagram showing a preferred embodiment of the basic encoder according to the present invention.

FIG. 2 is a block diagram showing the encoding of a motion picture film source in more detail.

FIG. 3 is a block diagram showing the encoding of an NTSC video source in more detail.

FIG. 4 is a block diagram showing the encoding of a PAL video source in more detail.

FIG. 5 is a block diagram showing the encoding of an HDTV/ATV video source in more detail.

FIG. 6 is a block diagram showing a preferred embodiment of the basic decoder according to the present invention.

FIG. 7 is a table useful in understanding the descriptions of FIGS. 8 through 13.

FIG. 8 is a block diagram showing the decoding of a 24 fps or 25 fps film source for NTSC output in more detail.

FIG. 9 is a block diagram showing the decoding of a 24 fps or 25 fps film source for PAL output in more detail.

FIG. 10 is a block diagram showing the decoding of a 60 Hz video source for NTSC output in more detail.

FIGS. 11A and 11B are block diagrams showing the decoding of a 60 Hz video source for PAL output in more detail.

FIGS. 12A and 12B are block diagrams showing the decoding of a 50 Hz video source for NTSC output in more detail.

FIG. 13 is a block diagram showing the decoding of a 50 Hz video source for PAL output in more detail.

FIG. 14 is a block diagram showing the decoding of a 24 fps film source recorded or transmitted at 24 Hz for PAL output in more detail for the case in which the playback medium cannot alter the record speed (e.g., for the case of transmission, such as broadcasting).

FIG. 15 is a block diagram showing the decoding of an HDTV/ATV video source in more detail.

DETAILED DESCRIPTION OF THE PREFERRED EMBODIMENTS

Referring to FIG. 1, in its preferred embodiment the basic encoder 2 has four inputs: a video input and three command inputs, 525/625 lines, pan and scan centering and aspect ratio. The video input may be any one of four video sources: (1) 24 Hz or 25 Hz progressive scan ("1/1"), 625- (preferably) or 525-line video derived from 24 fps or 25 fps, respectively, motion picture film, (2) nominal 60 Hz two-to-one interlaced ("2/1") 525-line conventional NTSC video, (3) nominal 50 Hz two-to-one interlaced ("2/1") 625-line conventional PAL video, or (4) high-definition television (HDTV) (sometimes referred to as advanced television or "ATV"). The ATV source may be, for example, according to any of the six United States "Grand Alliance Video Formats" (e.g., 1920 horizontal pixels×1080 vertical pixels at 24 pictures/sec progressive, 30 pictures/sec progressive, 60 pictures/sec interlaced; and 1280 horizontal pixels×720 vertical pixels at 24 pictures/sec progressive, 30 pictures/sec progressive and 60 pictures/sec progressive) or other format such as one of the European HDTV/ATV format proposals in which the frame rate is 25, 50 or 100 Hz.

The video sources may be analog video signals or video signals in coded bit stream form. If the video source is in analog form, the encoder should include analog-to-digital converters for converting the analog video signal to a coded bit stream form. Such converters are well known in the art. The NTSC and PAL video signals may be in component rather than composite form. If they are in composite form, the encoder 2 should include appropriate NTSC and PAL decoders. The "525/625 LINES" command identifies the nominal number of lines in the video source. For a film source, the "PAN & SCAN CENTERING" command, if available, is the motion picture film director's pan and scan information. Also for a film source, the "ASPECT RATIO" command specifies the aspect ratio (e.g., 4:3, 16:9, etc.) of the film source.

Still referring to FIG. 1, in its preferred embodiment the basic encoder has seven outputs, all of which are recorded on the DVD or sent to other transmission or storage: video data in coded bit stream form representing progressively scanned pictures at a 24 Hz or 25 Hz frame rate, record speed "1×" or "(25/24)×" (one bit is sufficient) (24 Hz pictures are recorded at a disc speed of "1×", 25 Hz pictures are recorded at a disc speed of "(25/24)×"), motion information in coded bit stream form (one bit or multiple bits) (present only when the source is video rather than film), data indicating whether the source is film or video (FILM YES/NO) (one bit), the motion picture film director's pan and scan centering data (present only in some cases when the source is film) (multiple bits), the aspect ratio of the source (present only when the source is film) (multiple bits), and the nominal number of lines in the source, 525 or 625 (one bit).

FIG. 2 shows the encoding of a motion picture film source in more detail. The motion picture film source, which may be at 24 fps or 25 fps, but is typically at 24 fps, is converted to video by a conventional film chain 4 which typically has a high vertical sampling rate of about 1500 lines in order to satisfy the Nyquist sampling theorem. The vertical sampling rate is reduced to either 625 or 525 lines for encoding onto the video disc. The 625-line option provides a better match of the vertical and horizontal picture resolutions and less degradation of the film's vertical resolution. However, the 525-line option permits less expensive playback by a basic NTSC-only decoder. In order to avoid Nyquist undersampling artifacts in the resulting 625- or 525-line video, the film chain output is first applied to a low-pass filter 6, which may be, for example, a 27-pole vertical low-pass filter having a response down 20 dB at 525- or 625-line vertical resolution. The filtered 1500-line 24 Hz (or 25 Hz in the case of a 25 fps film source) progressively-scanned signal is then down converted to a 525- or 625-line 24 Hz (or 25 Hz) progressively scanned signal. Such vertical low-pass filters and down converters are well known in the art. The down-converted video signal is then applied to a data rate compressor 10, which may be, for example, a compressor supporting the MPEG-2 video standard. The particular form of data compression is not critical to the invention. The bit rate compressed 24 Hz (or 25 Hz) frame rate progressively-scanned video data is recorded by any suitable means on a video disc operating at a record speed of "1×" if the source is 24 fps film and "(25/24)×" if the source is 25 fps film. The details of the video disc itself and the manner of applying and extracting data from the disc are not the subject of the invention. Many video disc formats and recording and playback techniques for them are well known in the art. Also recorded on the video disc are the 525/625 line indication, the film YES indication, the pan and scan centering information (if available), and the aspect ratio of the film. The record speed indication controls the disc speed and is recorded for use in some playback situations, as described below. There is no motion information when the source is film.

FIG. 3 shows the encoding of an NTSC video source in more detail. A conventional 525-line, 60 Hz 2/1 interlaced NTSC video source is applied to a conventional standards converter 12. The standards converter has a 525/625-line mode selection—in the 525-line mode, only interlaced-to-progressive scan conversion is applied, converting the signal from a 525-line 2/1 interlaced nominal 60 Hz (field rate) video signal to a 525-line progressively-scanned nominal 24 Hz (frame rate) video signal. However, as shown in FIG. 3, when it is desired to record an NTSC source with 625-line vertical resolution, the standards converter 12 provides at its output a 625-line progressively-scanned nominal 24 Hz (frame rate) video signal. In both cases, the standards converter also generates motion information. Details of the generation of the motion information is described below. The output of the standards converter 12 is applied to a data rate compressor 14, which may be of the same type as compressor 10. The compressed 24 Hz frame rate progressively-scanned video data is recorded by any suitable means on a video disc operating at a record speed of "1×". Also recorded on the video disc are the motion information, the record speed, the 625 line indication, and the film NO indication.

The motion information may be represented by a one-bit motion/no-motion word, indicating if a pixel or contiguous group of pixels in a current field is different (motion) or the same (no motion) as the pixel or group of pixels in the corresponding picture location of the previous field. For better resolution, but at greater cost and complexity, the motion signal may be a multi-bit motion vector word indicating the magnitude and direction of pixel movement from field to field. The detection of pixel motion in interlaced television signals on a frame-to-frame basis and the generation of frame-to-frame motion information data is well known. However, it is preferred that the motion information is independent of motionless vertical transitions between the temporally displaced fields in the interlaced television signal. Techniques for detecting true motion, independent of motionless vertical transitions between the temporally displaced fields, are taught in U.S. Pat. No. 5,291,280 and published international patent application WO 94/30006. U.S. Pat. No. 5,291,280 is hereby incorporated by reference in its entirety. Known techniques for generating frame-to-frame motion information data may be readily adapted for generating field-to-field motion information using said field-to-field motion detection techniques.

FIG. 4 shows the encoding of a PAL video source in more detail. A conventional 625-line, 50 Hz 2/1 interlaced PAL video source is applied to a conventional standards converter 16. The standards converter has a 525/625-line mode selection—in the 625-line mode, only interlaced-to-progressive scan conversion is applied, converting the signal from a 625-line 2/1 interlaced nominal 50 Hz (field rate) video signal to a 625-line progressively-scanned nominal 25 Hz (frame rate) video signal. However, as shown in FIG. 4, when it is desired to record a PAL source with 525-line vertical resolution, the standards converter 16 provides at its output a 525-line progressively-scanned nominal 25 Hz (frame rate) video signal. In both cases, the standards converter also generates motion information. Details of the generation of the motion information is described above. The output of the standards converter 12 is applied to a data rate compressor 18, which may be of the same type as compressors 10 and 14. The compressed 25 Hz frame rate progressively-scanned video data is recorded by any suitable means on a video disc operating at a record speed of "(25/24)×". Also recorded on the video disc are the motion information, the record speed, the 625-line indication, and the film NO indication. A 25 Hz video frame rate and a "(25/24)×" disc record speed are chosen because of the present cost and complexity of converting 25 Hz video to 24 Hz video.

FIG. 5 shows the encoding of an HDTV/ATV source in more detail. The treatment of a progressively-scanned HDTV/ATV video source is similar to the treatment of a film source. Proposed formats for United States advanced video formats include 24 Hz, 30 Hz and 60 Hz progressively-scanned video. Such video sources also require vertical low pass filtering and down conversion to provide 525-line or, preferably, 625-line 24 Hz progressively-scanned video information (to be recorded at a record disc speed of "1×"). Proposed formats for European advanced video formats include 25 Hz, 50 Hz and 100 Hz progressively-scanned video. Such video sources also require vertical low pass filtering and down conversion to provide 525-line or, preferably, 625-line 25 Hz progressively-scanned video information (to be recorded at a record disc speed of "(25/24)×"). In order to avoid Nyquist undersampling artifacts in the resulting 625 or 525 line video, the HDTV signal is first applied to a low-pass filter 20, which may have, for example, the same characteristics as filter 6 described in connection with FIG. 2 (the filter characteristics may be less severe because the vertical line rate is less than in the case of the film source). The filtered HDTV signal is then down converted to a 525- or 625-line 24 Hz or 25 Hz progressively scanned signal by down converter 22. If the HDTV signal is interlaced, down converter 22 includes interlaced-to-progressive conversion. Such vertical low pass filters and down converters are well known in the art. The down converted video signal is then applied to a data rate compressor 24, which may be of the same type as compressors 10, 14 and 18. The compressed 24 Hz or 25 Hz frame rate progressively-scanned video data is recorded by any suitable means on a video disc operating at a record speed of "1×" or "(25/24)×", respectively. Also recorded on the video disc are the 525/625 line indication the film NO indication, and motion information generated by the down converter 22 when the source is interlaced or has a higher frame rate than 24 Hz or 25 Hz. Details of the generation of the motion information is described above.

Referring to FIG. 6, in its preferred embodiment the basic decoder 26 has seven inputs, matching the seven recorded outputs of the basic encoder of FIG. 1: video data in coded bit stream form representing progressively-scanned pictures at a 24 Hz or 25 Hz frame rate, motion information in coded bit stream form (present only when the original source is video rather than film), data indicating whether the source is film or video (FILM YES/NO), the motion picture film director's pan and scan centering data (present only in some cases when the original source is film), the aspect ratio of the source (present only when the original source is film), the record speed, and the nominal number of lines in the original source, 525 or 625. In addition, there may be two user inputs: a format selection, allowing the selection of pan and scan, letterbox or widescreen playback in the film's original format, and a PAL/NTSC playback standards selector. The disc playback speed may be "1×" or "(25/24)×" as is explained further below. Decoder 26 includes a data rate decompressor for decoding the data rate compression applied by the encoder. The decoder 26 outputs include a playback speed signal for controlling the playback speed of the video disc, and may include one or more of PAL and/or NTSC standard composite video outputs, PAL and/or NTSC composite (Y/C) video outputs, and outputs for advanced displays, including the video data, motion information and 525/625 line information. Although a "universal" decoder may include all of the various playback options, including advanced display, PAL, and NTSC, to lower cost, PAL-only or NTSC-only decoders may omit advanced playback outputs and provide only PAL or NTSC playback, respectively (each of which may be further limited to composite only). Alternatively, an advanced-display-only decoder may omit the PAL and/or NTSC outputs, greatly simplifying the decoder by eliminating standards conversion and re-interlacing.

Motion information in coded bit stream form (present only when the original source is video rather than film) comprising, as described above, for a pixel or groups of contiguous pixels, single-bit motion/no motion indicators or multi-bit motion vectors, is used in decoding for re-interlacing, for frame rate multiplication, or for re-interlacing and frame rate multiplication. For re-interlacing, the motion information allows the reconversion to interlaced video without noticeable interlacing and motion artifacts that would otherwise result. The motion information makes it possible to split each progressively-scanned frame into a pair of interlaced fields which take temporal motion into account. For frame multiplication, the motion information allow active frame interpolation, taking actual motion into account, rather than passive frame interpolation using averaged motion. Passive frame interpolation would cause motion artifacts because of the greater motion content in video sources as a result of, for example, faster camera panning techniques. The use of motion information for interlacing and frame interpolation (in other contexts) is well known. See, for example, "Advances in Picture Coding," by Musmann et al, *Proc. IEEE*, vol. 73, no. 4, pp. 523–548, April 1985; "Motion-Compensated Transform Coding," by Netravali et al, *Bell System Technical Journal*, vol. 58, no. 7, September 1979, pp. 1703–1718; "Motion-Compensated Television Coding, Part I," by Netravali et al, *Bell System Technical Journal*, vol. 58, no. 3, March 1979, pp. 631–670; "Adaptive Quantization of Picture Signals Using Spatial Masking," by Netravali et al, *Proc. IEEE*, vol. 65, no. 4, April 1977, pp. 536–548; "A Codec for HDTV," by Arun Netravali, et al, *IEEE Trans. Consumer Electron.*, vol 38, no. 3, pp. 325–340, August 1992; and *Video Demystified* by Keith Jack, HighText Publications, Inc., Solana Beach, Calif., 1993, "Motion Prediction and Compensation," pp. 379–383.

FIG. 7 is a table showing Video Record Frame Rate, Record Disc Speed, NTSC Playback Frame Rate, NTSC Playback Disc Speed, PAL Playback Frame Rate, and PAL Playback Disc Speed for various moving picture sources. Film at 24 fps and 60 Hz video sources are recorded with a progressive scan frame rate of 24 Hz and at a disc speed of "1×". This also applies to HDTV sources having a frame rate of 24 Hz, 30 Hz or 60 Hz, for example. Film at 25 fps and 50 Hz video sources are recorded with a progressive scan frame rate of 25 Hz and at a disc speed of "(25/24)×". This also applies to HDTV sources having a frame rate of 25, 50 Hz or 100 Hz, for example. The various playback frame rates and playback disc speeds are referred to in the following descriptions of FIGS. 8–13.

FIG. 8 shows the decoding of a 24 fps or 25 fps film source for NTSC output in more detail. The film source may have been recorded at either 24 Hz (24 fps film source) or 25 Hz (25 fps film source). For NTSC output, a playback speed of "1×" is automatically selected (logic, not shown, selects the "1×" playback speed based on the FILM YES and user selection of NTSC), causing the progressively-scanned video to come off the disc at a nominal 24 Hz frame rate. A data rate decompressor 28 decodes the data rate compression applied by the encoder. The 525- or 625-line 24 Hz progressively-scanned video data may be provided for an advanced display output along with an indication that the data is 525 or 625 lines. There is no motion information for a film source. The video data and line indication is applied to a conventional standards converter 30 which, if necessary, converts 625-line video data to 525-line 24 Hz progressive scanned video data, which is, in turn applied to a conventional inverse 3-2 pulldown processor (invoked by the FILM YES signal) and interlacer 32 which provides a 525-line 60 Hz (field rate) 2-1 interlaced video signal at its output. The interlaced signal is in turn applied to a conventional NTSC encoder 34. NTSC encoder 34 provides a composite NTSC output and/or a component (Y/C) NTSC output.

FIG. 9 shows the decoding of a 24 fps or 25 fps film source for PAL output in more detail. The film source may have been recorded at either 24 Hz (24 fps source) or 25 Hz (25 fps source). For PAL output, a playback speed of "(25/24)×" is automatically selected (logic, not shown, selects the "(25/24)×" playback speed based on the FILM YES and user selection of PAL), causing the video data to come off the disc at a nominal 25 Hz frame rate. A data rate decompressor 28 decodes the data rate compression applied by the encoder. The 525- or 625-line 25 Hz progressively-scanned video data may be provided for an advanced display output along with an indication that the data is 525 or 625 lines. There is no motion information for a film source. The video data and line indication is applied to a conventional standards converter 38 which, if necessary, converts 525-line video data to 625-line 25 Hz progressive scanned video data, which is, in turn applied to a conventional interlacer 40 which provides a 625-line 50 Hz 2-1 interlaced video signal at its output. The interlaced signal is in turn applied to a conventional PAL encoder 42. PAL encoder 42 provides a composite PAL output and/or a component (Y/C) PAL output.

FIG. 10 shows the decoding of a 60 Hz video source for NTSC output in more detail. The 60 Hz video source was recorded at 24 Hz. For NTSC output, a playback speed of "1×" is automatically selected (logic, not shown, selects the "1×" playback speed based on the "1×" record speed, FILM NO and user selection of NTSC), causing the video data to come off the disc at a nominal 24 Hz frame rate. A data rate decompressor 28 decodes the data rate compression applied by the encoder. The 525- or 625-line 24 Hz progressively-scanned video data may be provided for an advanced display output along with the motion information and an indication that the data is 525 or 625 lines. The video data, motion information, and line indication is applied to a conventional standards converter 30 which, if necessary, converts 625-line video data to 525-line 24 Hz progressive scanned video data, which is, in turn applied, along with the motion information, to an interlacer 36 which provides a 525-line 60 Hz (field rate) 2-1 interlaced video signal at its output. The interlaced signal is in turn applied to a conventional NTSC encoder 34. NTSC encoder 34 provides a composite NTSC output and/or a component (Y/C) NTSC output.

FIGS. 11A and 11B show the decoding of a 60 Hz video source for PAL output in more detail. As noted above, the 60 Hz video source was recorded at 24 Hz. For PAL output, either a playback speed of "1×" or "(25/24)×" may be automatically selected (logic, not shown, selects either the "1×" or "(25/24)×" playback speed based on the "1×" record speed, FILM NO and user selection of PAL), causing the video data to come off the disc at a nominal 24 Hz frame rate when the "1×" playback speed is selected (FIG. 11A) or at a nominal 25 Hz when the "(25/24)×" playback speed is selected (FIG. 11B).

Referring to FIG. 11A, a data rate decompressor 28 decodes the data rate compression applied by the encoder. The 525- or 625-line 24 Hz progressively-scanned video data may be provided for an advanced display output along with the motion information and an indication that the data is 525 or 625 lines. The video data, motion information and line indication is applied to a conventional standards converter and interlacer 56 which converts 525- or 625-line 24 Hz progressive scanned video data to 625-line, 50 Hz 2-1 interlaced video data, which is, in turn applied, to a conventional PAL encoder 42. PAL encoder 42 provides a composite PAL output and/or a component (Y/C) PAL output.

Referring to FIG. 11B, a data rate decompressor 28 decodes the data rate compression applied by the encoder.

The 525- or 625-line 25 Hz progressively-scanned video data may be provided for an advanced display output along with the motion information and an indication that the data is 525 or 625 lines. The video data, motion information and line indication is applied to a conventional standards converter and interlacer 56a which converts 525- or 625-line 25 Hz progressive scanned video data to 625-line, 50 Hz 2-1 interlaced video data, which is, in turn applied, to a conventional PAL encoder 42. PAL encoder 42 provides a composite PAL output and/or a component (Y/C) PAL output. In the FIG. 11B embodiment, the standards converter and interlacer 56a is simpler than the corresponding element of FIG. 11A. The video and audio produced by the arrangement of FIG. 11B is slightly speed up.

FIGS. 12A and 12B show the decoding of a 50 Hz video source for NTSC output in more detail. As noted above, the 50 Hz video source was recorded at 25 Hz. For NTSC output, either a playback speed of "1×" or "(25/24)×" may be automatically selected (logic, not shown, selects either the "1×" or "(25/24)×" playback speed based on the "(25/24)×" record speed, FILM NO and user selection of NTSC), causing the video data to come off the disc at a nominal 25 Hz when the "(25/24)×" playback speed is selected (FIG. 12A) or at a nominal 24 Hz frame rate when the "1×" playback speed is selected (FIG. 12B).

Referring to FIG. 12A, a data rate decompressor 28 decodes the data rate compression applied by the encoder. The 625-line 25 Hz progressively-scanned video data may be provided for an advanced display output along with the motion information and an indication that the data is 625 lines. The video data, motion information and line indication is applied to a conventional standards converter and interlacer 54 which converts 625-line 25 Hz progressive scanned video data to 525-line, 60 Hz 2-1 interlaced video data, which is, in turn applied, to a conventional NTSC encoder 34. NTSC encoder 34 provides a composite NTSC output and/or a component (Y/C) NTSC output.

Referring to FIG. 12B, a data rate decompressor 28 decodes the data rate compression applied by the encoder. The 625-line 24 Hz progressively-scanned video data may be provided for an advanced display output along with the motion information and an indication that the data is 625 lines. The video data, motion information and line indication is applied to a conventional standards converter and interlacer 54a which converts 625-line 24 Hz progressive scanned video data to 525-line, 60 Hz 2-1 interlaced video data, which is, in turn applied, to a conventional NTSC encoder 34. NTSC encoder 34 provides a composite NTSC output and/or a component (Y/C) NTSC output. The standards converter 54a of the FIG. 12B arrangement is more complex than converter 54 of the FIG. 12A arrangement. In addition the video and audio produced by the arrangement of FIG. 12B is slightly slowed down.

FIG. 13 shows the decoding of a 50 Hz video source for PAL output in more detail. As noted above, the 50 Hz video source was recorded at 25 Hz. For PAL output, a playback speed of "(25/24)×" is automatically selected (logic, not shown, selects either the "(25/24)×" playback speed based on the "(25/24)×" record speed, FILM NO and user selection of PAL), causing the video data to come off the disc at a nominal 25 Hz frame rate. A data rate decompressor 28 decodes the data rate compression applied by the encoder. The 525- or 625-line 25 Hz progressively-scanned video data may be provided for an advanced display output along with the motion information and an indication that the data is 525 or 625 lines. The video data, motion information and line indication is applied to a conventional standards converter 38 which, if necessary, converts 525-line video data to 625-line 25 Hz progressive scanned video data, which is, in turn applied, along with the motion information, to an interlacer 44 which provides a 625-line 50 Hz 2-1 interlaced video signal at its output. The interlaced signal is in turn applied to a conventional PAL encoder 46. PAL encoder 46 provides a composite PAL output and/or a component (Y/C) PAL output.

FIG. 14 shows a modified decoder 26' for the decoding of a 24 fps film source recorded (or transmitted) at 24 Hz for PAL output in more detail for the case in which the playback medium cannot alter the record speed (e.g., for the case of transmission, such as broadcasting) and, therefore, is required to convert the 24 Hz progressively-scanned video to a frame rate playable on conventional PAL playback apparatus. A data rate decompressor 28 decodes the data rate compression applied by the encoder. The 525- or 625-line 24 Hz progressively-scanned video data may be provided for an advanced display output along with an indication that the data is 525 or 625 lines. There is no motion information for a film source. The video data and line indication is applied to a conventional standards converter 48 which, if necessary, converts 525-line video data to 625-line 24 Hz progressive scanned video data, which is, in turn applied to a conventional interlacer 50 which provides a 651 line 48 Hz 2-1 interlaced video signal at its output. The interlaced signal is in turn applied to a modified PAL encoder 42 (modified in that it provides a "near-PAL" output having a slightly lower frame rate). PAL encoder 42 provides a composite PAL signal at a 48 Hz frame rate output and/or a component (Y/C) PAL 48 Hz output. A 48 Hz frame rate PAL signal is viewable on most conventional PAL reproducing equipment.

FIG. 15 shows the decoding of an HDTV Hz video source in more detail. The advanced displays outputs of the decoder 26 or 26' (FIGS. 6–14) are applied to processors including a video line multiplier 58, a vertical non-linear enhancer 60, and a video frame multiplier 62. The line multiplier 58 receives the video data from the advanced displays output of a decoder 26 or 26' along with the 525/625 line indication signal. The motion information, if present, is applied to the frame multiplier 62. The line rate of the progressively scanned signal is increased (preferably by a factor of 1.5 or 2) by interpolation in line multiplier 58, including appropriate post filtering. The vertical non-liner enhancer 60 spectrally expands the line multiplied signal in the vertical domain. In order to take advantage of the improved vertical resolution, the resulting television signal should be displayed on a monitor having sufficiently good optical qualities, such as a direct view monitor with a small dot size or a high quality projection system employing three monochrome color tubes.

Vertical bandwidth enhancement simulates a wide bandwidth vertical detail signal. The vertical detail signal is self-derived from the line-multiplied signal itself. Scanning line multiplication allows a decrease in the vertical transition rise time to be practical and visible. The degree of vertical spectral expansion should be correlated with the amount of increase in the line rate. In the frequency domain, scanning produces a series of repeating periodic spectra centered at multiples of the line rate. Vertical bandwidth expansion widens each of the spectra, causing overlapping unless the spectra are initially spaced far enough apart. A sufficient multiplication of line rate, preferably by interpolation, permits self-generated bandwidth expansion without generating aliasing artifacts caused by spectral overlapping.

Spectral or bandwidth expansion in the vertical domain shortens the rise time of vertical transitions, sharpening the transitions without appreciable pre-shoot, overshoot or ringing. Spectral or bandwidth expansion may be provided by a non-linear enhancer which, at least for some signal transition amplitude levels, expands the bandwidth of the applied signal by controlled harmonic distortion of the original spectrum in the vertical domain. Harmonic distortion may be implemented by many forms of non-linear processing, including processing by multiplicative means and by gating means. Such devices are also known in the art by other nomenclature, including "video crispener" and signal processors providing "controlled harmonic generation," "spectral expansion," "shorter rise and fall times without preshoot and overshoot," "multiplicative enhancement" and "gated enhancement."

Examples of prior art spectral expansion are described in U.S. Pat. No. 2,740,071 to Goldmark and Reeves, U.S. Pat. No. 2,851,522 to Hollywood, and in an article by Goldmark and Hollywood entitled "A New Technique for Improving the Sharpness of Television Pictures", *Proceedings of the IRE*, October 1951, p. 1314. An improvement in non-linear spectral expansion techniques is set forth in the present inventor's prior U.S. Pat. No. 4,030,121 and other examples of non-linear signal enhancement are set forth in the present inventor's U.S. Pat. Nos. 4,504,853 and 5,014,119. The process is equally applicable in the horizontal and vertical dimensions, although in the vertical domain the result does not affect the overall signal bandwidth but rather the bandwidth of the periodic line-rate-spaced spectra. In his U.S. Pat. Nos. 5,151,783 and 5,237,414, the present inventor explains how non-linear enhancement may be applied in the vertical domain. Each of the aforementioned United States Patents cited in this paragraph is hereby incorporated by reference in its entirety.

Line multiplier 58 provides at its output a progressively scanned signal having kn-lines per frame at a frame rate of 24 or 25 Hz. The variable "n" represents 525 or 625 lines and the coefficient "k" is the line rate multiplication factor which is greater than one and is preferably large enough to permit enough vertical bandwidth expansion to provide a psychovisual improvement in vertical resolution without causing psychovisually displeasing aliasing artifacts. Although it is preferred that the coefficient "k" be in the order of 1.5 or 2, the exact value of "k" is not critical. Thus, when k is 2, the resulting signal has 2 n-lines per frame, a rate of four times the number of lines per interlaced field in the original source video (thereby constituting a line "quadrupler"). The line rate multiplier 58 preferably increases the line rate by interpolation rather than line duplication. As is well known, the line rate multiplier should include appropriate anti-aliasing postfiltering having a filter bandwidth commensurate with the amount of the line increase. In the digital domain, line multiplication is accomplished by vertical upsampling and filtering.

The output of line multiplier 58 is applied to vertical non-linear enhancer 60 which shortens the rise time of vertical transitions thus psychovisually enhancing vertical detail in the reproduced picture. Preferably, in order to reduce perceived flicker, the output of vertical non-linear enhancer 60 may be applied to a frame multiplier 62 prior to display. Generating new frames by interpolation (passive interpolation when the source is film and active interpolation using the motion information when the source is video), the frame multiplier multiplies the progressively-scanned frame rate by a factor of at least 2 and, preferably, by a factor of 3 or 4.

In practice, luminance and chrominance signal components are processed separately in the same manner except that chrominance vertical bandwidth expansion may be controlled by luminance vertical bandwidth transitions because of the robustness of the luminance signal components. The use of luminance transitions to sharpen corresponding chroma transitions in the horizontal domain is disclosed in prior U.S. Patents of the present inventor: U.S. Pat. Nos. 4,030,121 and 4,504,853, each of which is incorporated by reference in its entirety. Alternatively, the chrominance components vertical bandwidth expander may have its own chrominance transition detector, thus operating independently of the luminance components vertical bandwidth expander. As a further alternative, the chrominance components vertical bandwidth expander may have its own chrominance transition detector but operate in cooperation with the luminance vertical transition detector such that detected chrominance transitions control chrominance vertical bandwidth expansion only when a chrominance transition occurs in the absence of a concurrent luminance transition.

Alternatively, vertical bandwidth expansion may be provided only for luminance signal components. As a further alternative, vertical bandwidth expansion may be provided only for chrominance signal components, in which case there are two sub-alternatives: (1) control of the chrominance components vertical bandwidth expander is derived from luminance vertical transitions, and (2) control of the chrominance components vertical bandwidth expander is derived from chrominance transitions.

I claim:

1. A method of encoding television signals comprising
   encoding n frame/per/second motion picture film as one or more coded bit streams representing a progressively scanned television signal having an n Hz frame rate, and
   encoding a 2-1 interlaced television signal having a field rate of m Hz as one or more coded bit streams representing a progressively scanned television signal having an n Hz frame rate, where m is greater than n, and a motion signal representing true picture motion independent of motionless vertical transitions between the temporally displaced fields in the interlaced television signal.

2. A method of decoding television signals comprising
   receiving one or more coded bit streams representing a progressively scanned television signal having an n Hz frame rate and, when the progressively scanned television signal is derived from a 2-1 interlaced television signal having a field rate of m Hz, where m is greater than n, a motion signal representing true picture motion independent of motionless vertical transitions between the temporally displaced fields in the interlaced television signal, and
   converting the received one or more coded bit streams to one or more coded bit streams representing a 2-1 interlaced television signal having a field rate of p Hz, where p is equal to or greater than n, said converting including deriving one or more coded bit streams representing new television fields and frames from said one or more coded bit streams representing said progressively scanned television signal and said motion signal, whereby the interlaced television signal represented by said one or more coded bit streams resulting from the conversion has smooth motion substantially without artifacts.

3. A method of decoding television signals comprising
   receiving one or more coded bit streams representing a progressively scanned television signal having an n Hz frame rate and, when the progressively scanned television signal is derived from a 2-1 interlaced television signal having a field rate of m Hz, where m is greater than n, a motion signal representing true picture motion independent of motionless vertical transitions between the temporally displaced fields in the interlaced television signal, and converting the received one or more coded bit streams to one or more coded bit streams representing a q Hz progressively scanned television signal, where q is greater than n, said converting including deriving one or more coded bit streams representing new television frames from said one or more coded bit streams said progressively scanned television signal and said motion signal, whereby the progressively scanned television signal represented by said one or more coded bit streams resulting from the conversion has smooth motion substantially without artifacts.

\* \* \* \* \*